(12) United States Patent
Yoo (10) Patent No.: US 6,216,225 B1
(45) Date of Patent: Apr. 10, 2001

(54) PC SYSTEM HAVING FLASH-ROM CONTROLLING DEVICE AND METHOD FOR PROTECTING BIOS STORED IN FLASH-ROM

(75) Inventor: Chang-woong Yoo, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/163,392

(22) Filed: Sep. 30, 1998

(30) Foreign Application Priority Data

Sep. 30, 1997 (KR) .................................. 97-50373

(51) Int. Cl.[7] ........................................... G06F 9/00
(52) U.S. Cl. ................................. 713/2; 710/200
(58) Field of Search ...................... 713/2, 1; 710/200

(56) References Cited

U.S. PATENT DOCUMENTS

| 4,864,560 | * | 9/1989 | Quinquis et al. | 370/413 |
|---|---|---|---|---|
| 5,136,713 | * | 8/1992 | Bealkowski et al. | 713/2 |
| 5,189,665 | * | 2/1993 | Niehaus et al. | 370/248 |
| 5,517,253 | * | 5/1996 | Lange | 348/513 |
| 5,522,076 | | 5/1996 | Dewa et al. | |
| 5,550,997 | | 8/1996 | Ip et al. | |
| 5,572,572 | * | 11/1996 | Kawan et al. | 379/90.01 |
| 5,671,413 | * | 9/1997 | Shipman et al. | 713/2 |
| 5,706,407 | * | 1/1998 | Nakamura et al. | 395/86 |
| 5,742,935 | | 4/1998 | Hazen et al. | |
| 5,748,940 | | 5/1998 | Angelo et al. | |

* cited by examiner

Primary Examiner—Robert Beausoleil
Assistant Examiner—Rita Ziemer
(74) Attorney, Agent, or Firm—Robert E. Bushnell, Esq.

(57) ABSTRACT

A device controlling a flash-read-only-memory (flash-ROM) storing a basic input output system (BIOS) of a personal computer including a controller controlled by software generating a first control signal or a second control signal controlling a chip enable signal of the flash-ROM, and a control buffer, having an input port receiving the chip enable signal and an output port connected to a chip enable port of the flash-ROM, outputting the chip enable signal unchanged when the control signal generated by the controller is the first control signal and changing the chip enable signal to be inactive and outputting the changed chip enable signal when the control signal generated by the controller is the second control signal.

27 Claims, 4 Drawing Sheets

PC SYSTEM HAVING FLASH-ROM CONTROLLING DEVICE AND METHOD FOR PROTECTING BIOS STORED IN FLASH-ROM

CLAIM OF PRIORITY

This application makes reference to, incorporates the same herein, and claims all benefits accruing under 35 U.S.C. §119 from an application entitled PC System Having Flash-rom Controlling Device And Method For Protecting Bios Stored in Flash-ROM earlier filed in the Korean Industrial Property Office on the 30$^{th}$ day of September 1997, and there duly assigned Serial No. 97-50373, a copy of which is annexed hereto.

BACKGROUND OF THE INVENTION

1. Technical Field

The present invention relates to a memory controlling apparatus of a computer system, and more particularly to a device for protecting a basic input output system (BIOS) stored in a flash-read-only-memory (flash-ROM) of a computer system from malicious computer programs, and a method thereof.

2. Related Art

Computer systems are information handling systems that are utilized by many individuals and businesses today. A computer system can be defined as a microcomputer that includes a central processing unit (CPU), a volatile memory, a non-volatile memory, a display monitor, a keyboard, a mouse, a floppy diskette drive, a compact disc-read only memory (CD-ROM) drive, a modem, a hard disk storage device, and a printer. Typically, a computer system's main board, which is a printed circuit board known as a motherboard, is used to electrically connect these components together.

One example of non-volatile memory is read only memory (ROM). Information stored in non-volatile memory can remain unchanged even when there is a power failure. The information stored in non-volatile memory will stay there until it is changed. Read only memory is used to store important information such as instructions for the central processing unit (CPU). There are different types of read only memory including electrically-erasable-programmable-read-only-memory (EEPROM) chip and flash-read-only-memory (flash-ROM). The flash-ROM can also be referred to as flash memory. There are differences between an EEPROM chip and flash-ROM, as shown below.

Occasionally the important information stored in ROM needs to be updated or modified. When the information to be modified is stored in an EEPROM chip, higher-than-normal voltages are needed in order to erase the contents of the EEPROM chip. Alternatively, when the information to be modified is stored in flash-ROM, the information can be erased and reprogrammed using normal voltages inside a computer. Additionally, in order for information stored on an EEPROM chip to be modified, typically the EEPROM chip must be removed from a computer system, the new information must be stored on the EEPROM chip, and then the EEPROM chip must be reinstalled to the computer system. The flash-ROM is often preferred over the EEPROM chip because no chips need to be removed from the computer system in order to modify information stored in flash-ROM.

Computer systems include a basic input output system (BIOS) which is an especially important program stored in read only memory (ROM). The basic input output system tests a computer every time the computer is powered on. The basic input output system can allocate a computer system's resources automatically, making adjustments needed to accommodate new hardware. Also, the basic input output system governs how system board components interact.

A basic input output system that is stored in flash-read-only-memory (flash-ROM) is vulnerable to computer viruses. Computer viruses include malicious computer programs which can be used to erase information stored in memory. I believe there is a need to provide a method of coping with such malicious programs in order to protect a basic input output system stored in flash-ROM.

Exemplars of recent efforts in the art include U.S. Pat. No. 5,748,940 for a Secure Updating of Non-Volatile Memory issued to Angelo, et al., U.S. Pat. No. 5,550,997 for an in an Interactive Network Board, a Method and Apparatus for Preventing Inadvertent Loading of a Programmable Read Only Memory issued to Ip, et al., U.S. Pat. No. 5,742,935 for a Method and Apparatus for Controlling the Protection Mode of Flash Memory issued to Hazen, et al., and U.S. Pat. No. 5,522,076 for a Computer System Having Bios (Basic Input/output System)-rom (Read Only Memory) Writing Function issued to Dewa, et al.

While these recent efforts provide advantages, I note that they fail to adequately address how a basic input output system (BIOS) stored in flash-read-only-memory (flash-ROM) can be efficiently protected from malicious programs.

SUMMARY OF THE INVENTION

To solve the above problems, it is an objective of the present invention to provide a flash-read-only-memory (flash-ROM) controlling device by which the basic input output system (BIOS) recorded in a flash-ROM cannot be eliminated except by the manufacturer of the flash-ROM.

It is another objective of the present invention to provide a method for protecting and updating the basic input output system of a computer system having the above flash-read-only-memory controlling device.

It is still another objective of the present invention to provide a computer system having the above flash-read-only-memory.

Accordingly, to achieve the above objectives and others, there is provided a device for controlling a flash-read-only-memory storing a basic input output system of a personal computer including a controller controlled by software for generating a first control signal or a second control signal for controlling a chip enable signal of the flash-read-only-memory, and a control buffer, having an input port for receiving the chip enable signal and an output port connected to a chip enable port of the flash-read-only-memory, for outputting the chip enable signal as it is when the control signal generated by the controller is the first control signal and changing the chip enable signal to be inactive and outputting the changed signal when the control signal generated by the controller is the second control signal.

To achieve the above objectives and others, there is provided a method for protecting a basic input output system stored in a flash-read-only-memory (flash-ROM) of a personal computer, in which a CPU is initialized and a main memory is checked when the power of the personal computer is turned on, a basic input output system image stored in the flash-ROM is copied to a random access memory (RAM) area in the main memory and the basic input output system image is decompressed, a chip enable signal of the flash-ROM is changed to be inactive, and the initialization process of the personal computer is completed by the decompressed basic input output system and a boot process is performed by reading an operating system. In the above method, the flash-ROM having the basic input output system is activated when the personal computer is initialized and deactivated when the initialization process completed.

To achieve the above objectives and others, there is provided a method for updating the basic input output system of a personal computer stored in a flash-read-only-memory (flash-ROM) in a state in which a flash-ROM controlling device is initialized. The flash-ROM controlling device has a controller having a predetermined input/output address for generating a control signal to control a chip enable signal and a control buffer for controlling the chip enable signal according to the control signal. The method above is achieved by activating the chip enable signal by controlling the controller included in the flash-ROM controlling device, identifying the type of main chip set and the flash-ROM of the personal computer and determining control data with respect to the flash-ROM, eliminating the contents stored in the flash-ROM and storing a new basic input output system image in the flash-ROM, and reading and verifying the stored basic input output system image inactivating the chip enable signal by controlling the controller included in the flash-ROM controlling device.

To achieve the above objectives and others, there is provided a personal computer system having a flash-read-only-memory (flash-ROM) storing a basic input output system image and a controller for controlling the flash-ROM, wherein the controller activates the flash-ROM, when the personal computer is initialized, so that the basic input output system image stored in the flash-ROM can be copied to a RAM area in a main memory and inactivates the flash-ROM, when the copy operation is completed, to protect the basic input output system image stored in the flash-ROM.

To achieve these and other objects in accordance with the principles of the present invention, as embodied and broadly described, the present invention provides an apparatus controlling a memory unit of a computer system, the apparatus comprising: a memory unit storing predetermined instructions to be executed when said computer system is powered on; a control unit generating a control signal selected from among a first signal and a second signal, said control signal controlling an enable signal of said memory unit; and a control buffer unit having an input port receiving said enable signal and an output port connected to an enable port of said memory unit, said output port outputting to said memory unit said enable signal not modified when said control signal corresponds to said first signal thereby allowing said predetermined instructions stored in said memory unit to be revised, and said output port outputting to said memory unit said enable signal modified when said control signal corresponds to said second signal thereby not allowing said predetermined instructions stored in said memory unit to be revised.

To achieve these and other objects in accordance with the principles of the present invention, as embodied and broadly described, the present invention provides a method of protecting predetermined data stored in a memory of a computer apparatus, the method comprising the steps of: when a computer apparatus is powered on, starting a computer initialization process of said computer apparatus by initializing a processor of said computer apparatus and analyzing a main memory unit of said computer apparatus; copying first predetermined instructions stored in a first memory unit of said computer apparatus to a second memory unit and storing said first predetermined instructions in said second memory unit, said second memory unit being located within said main memory unit; decompressing said first predetermined instructions stored in said second memory unit and then storing second predetermined instructions in said second memory unit, said second predetermined instructions corresponding to said first predetermined instructions decompressed; modifying an enable signal of said first memory unit thereby preventing said first predetermined instructions stored in said first memory unit from being revised; and ending said computer initialization process of said computer apparatus by executing said second predetermined instructions stored in said second memory unit.

To achieve these and other objects in accordance with the principles of the present invention, as embodied and broadly described, the present invention provides a method of modifying data stored in a memory of a computer apparatus, the method comprising the steps of: performing a first modification of an enable signal to allow current data stored in a first memory unit to be revised, said first modification of said enable signal being performed by controlling a control unit, said control unit and a control buffer unit being included in a first memory controlling system of a computer apparatus, and said first modification of said enable signal being performed when said control unit generates a first control signal and said control buffer unit modifies said enable signal in response to said first control signal; identifying a main chip set and a first memory unit of said computer apparatus; storing new data in said first memory unit; reading and verifying said new data stored in said first memory unit; and performing a second modification of said enable signal to not allow said new data stored in said first memory unit to be revised, said second modification of said enable signal being performed by controlling said control unit, and said second modification of said enable signal being performed when said control unit generates a second control signal and said control buffer unit modifies said enable signal in response to said second control signal.

To achieve these and other objects in accordance with the principles of the present invention, as embodied and broadly described, the present invention provides a computer apparatus protecting data stored in a memory unit of the computer apparatus, the apparatus comprising: a flash-read-only-memory unit storing a basic input output system image of said apparatus; a main memory unit of said apparatus having a random access memory area; and a control unit controlling said flash-read-only-memory unit, activating said flash-read-only-memory, and inactivating said flash-read-only-memory, said activating of said flash-read-only-memory being performed when said apparatus is initialized to thereby allow a copying of said basic input output system image from said flash-read-only-memory to said random access memory area of said main memory unit, and said inactivating of said flash-read-only-memory being performed when said copying is complete to thereby not allow said basic input output system image stored in said flash-read-only-memory unit to be damaged.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
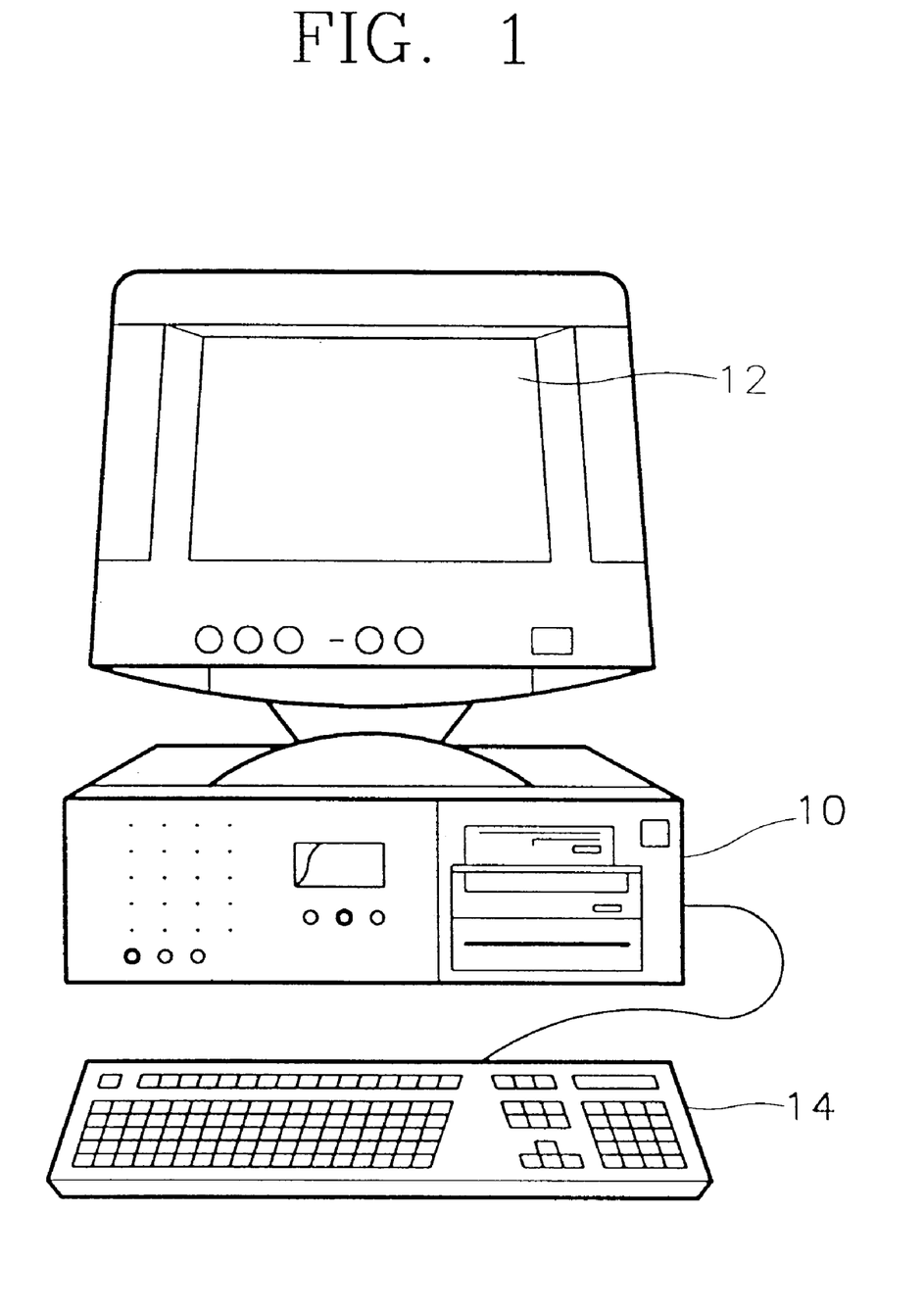
FIG. 1 is a view illustrating a computer.

Refer now to FIG. 1, which is a view illustrating a computer. FIG. 1 shows a computer system including a main case 10 and input/output devices. A monitor 12 and a keyboard 14 are basic input/output devices. A central processing unit (CPU), a memory, disk drivers, video controller, and a keyboard controller are installed in the main case 10.

Figure 2:
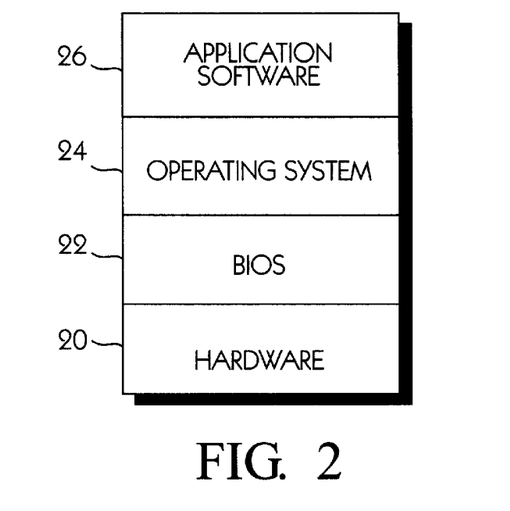
FIG. 2 is a diagram showing a hierarchic structure of hardware and software in a computer system.

Refer now to FIG. 2, which is a diagram showing a hierarchic structure of hardware and software in a computer system. FIG. 2 shows the hierarchical structure of hardware and software of a computer system. As shown in FIG. 2, a basic input output system (BIOS) 22 which is basically a read only memory (ROM) is installed above hardware 20. The basic input output system (BIOS) 22 checks the state of the computer system when power is applied and is comprised of a power on self test (POST) portion which performs a boot operation of the computer system and an interrupt process portion which manages peripheral equipment connected to the computer system. System software including an operating system 24 supports circumstances convenient for operation of application software 26 by directly controlling hardware or by indirectly controlling hardware via the basic input output system (BIOS).

At one time, the basic input output system was typically recorded in an electrically-erasable-programmable-read-only-memory (EEPROM). More recently, however, the basic input output system is typically recorded in flash memory or flash-ROM which can be reprogrammed after being installed in a computer system, instead of an EEPROM. The change from the use of an EEPROM to the use of a flash-ROM is due to the following problems caused when the basic input output system is recorded in an EEPROM.

When malfunction occurs to the basic input output system stored in an electrically-erasable-programmable-read-only-memory (EEPROM) of the computer system, or when the basic input output system is to be upgraded to a new version, the EEPROM must be disassembled from the computer system, a new basic input output system image must be recorded in the EEPROM, and the EEPROM having a new basic input output system image must be reinstalled in the computer system.

Alternatively, when malfunction occurs to the basic input output system stored in a flash-ROM of the computer system, or when the basic input output system is to be upgraded to a new version, the basic input output system can be easily updated with a new basic input output system using diskettes or through a computer network. For instance, the basic input output system in the flash-ROM of a computer system can be easily upgraded with a new basic input output system by reading control data from a main chip set installed in the computer system, identifying the type of the flash-ROMs using the control data, erasing the contents recorded in the flash-ROM., recording a new basic input output system image on the flash-ROM, and verifying the recorded basic input output system image.

However, since the main chip sets for a computer system are manufactured to be compatible with one another and methods for controlling the main chip set are similar, it is not difficult to make a program which destroys the basic input output system stored in flash-ROMs. In other words, computer programming experts are able to write malicious programs also known as virus programs which can damage the basic input output system stored in a flash-ROM. When the basic input output system is damaged by a malicious program, the computer system cannot be used at all and the repair thereof requires much time and money. Furthermore, a method for coping with such malicious programs has not been known to date.

Figure 3:
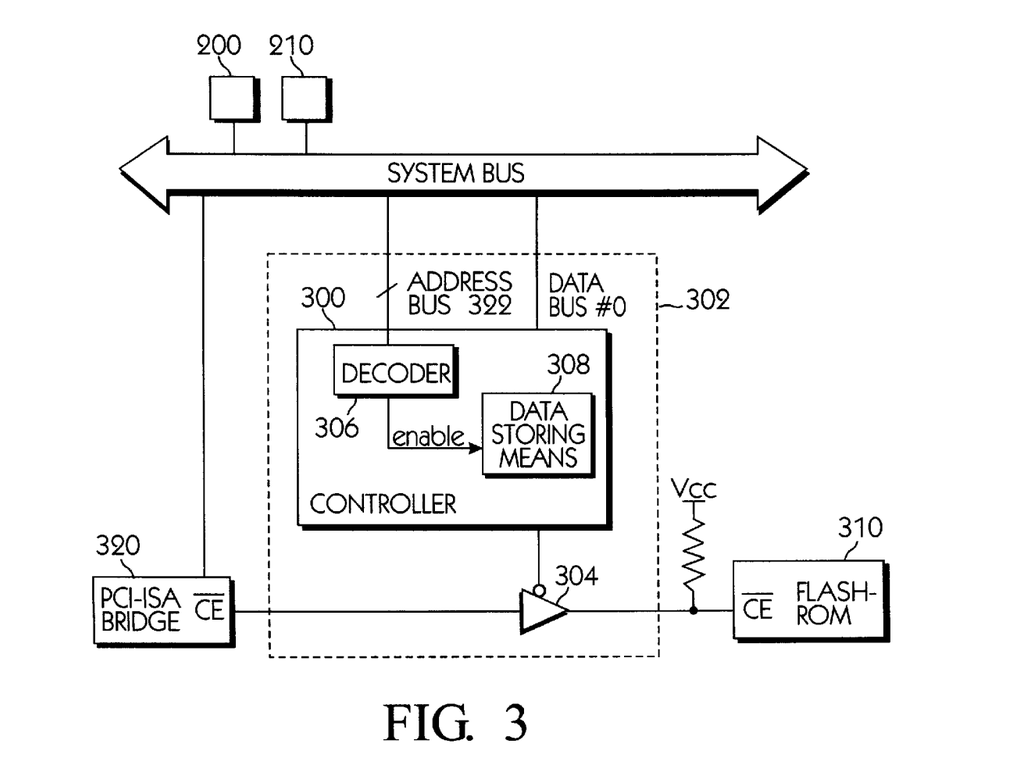
FIG. 3 is a block diagram showing the structure of a flash-read-only-memory (flash-ROM) controlling device, in accordance with the principles of the present invention.

Refer now to FIG. 3, which is a block diagram showing the structure of a flash-read-only-memory (flash-ROM) controlling device, in accordance with the principles of the present invention. FIG. 3 shows a device 300 which controls a flash-ROM recording of a basic input output system of a computer system according to the principles of the present invention. The device 300 includes a controller 302 and a control buffer 304. The controller 302 has its own input/output address and is directly controlled by software such as application programs. In addition, the controller 302 generates a control signal controlling a chip enable signal input to a flash-ROM 310. The control signal has a first control signal and a second control signal. Preferably, the first control signal is a low signal and the second control signal is a high signal. A voltage source Vcc, a random access memory (RAM) 200, and a main chip set 210 are also shown.

According to a preferred embodiment of the present invention, the controller 302 has a decoder 306 and a data storing means 308. The decoder 306 detects an input/output address assigned to itself from an address bus 322 of a system bus of a computer system. When the input/output address is detected by the decoder 306, the data storing means 308 stores a predetermined bit from a data bus #0 of the system bus and outputs the stored data as a control signal. Thus, when a predetermined value is stored in the data storing means 308 by software, the control signal continues until the value changes to another value. It is preferable that the data storing means 308 is a D type flip-flop circuit which inputs and stores the least significant bit of the data bus #0 and outputs the stored value as the control signal.

The control buffer 304 has an input port inputting the chip enable signal and an output port connected to a chip enable port $\overline{CE}$ of the flash-ROM 310. The control buffer 304 outputs the input chip enable signal as it is when a control signal CTL generated by the controller 302 is the first control signal, and outputs the input chip enable signal by changing the same to be inactive when the CTL is the second control signal. In other words, the control buffer 304 outputs the input chip enable signal unchanged when a control signal CTL generated by controller 302 corresponds to the first control signal, and the control buffer 304 outputs the input chip enable signal in a modified form when the CTL corresponds to the second control signal.

In this embodiment, the chip enable signal of the flash-ROM input to the control buffer 304 is generated in a PCI-ISA bridge 320. The PCI-ISA bridge 320 is a bus interface connecting a peripheral component interconnect (PCI) bus with an industry standard architecture (ISA) bus.

Figure 4:
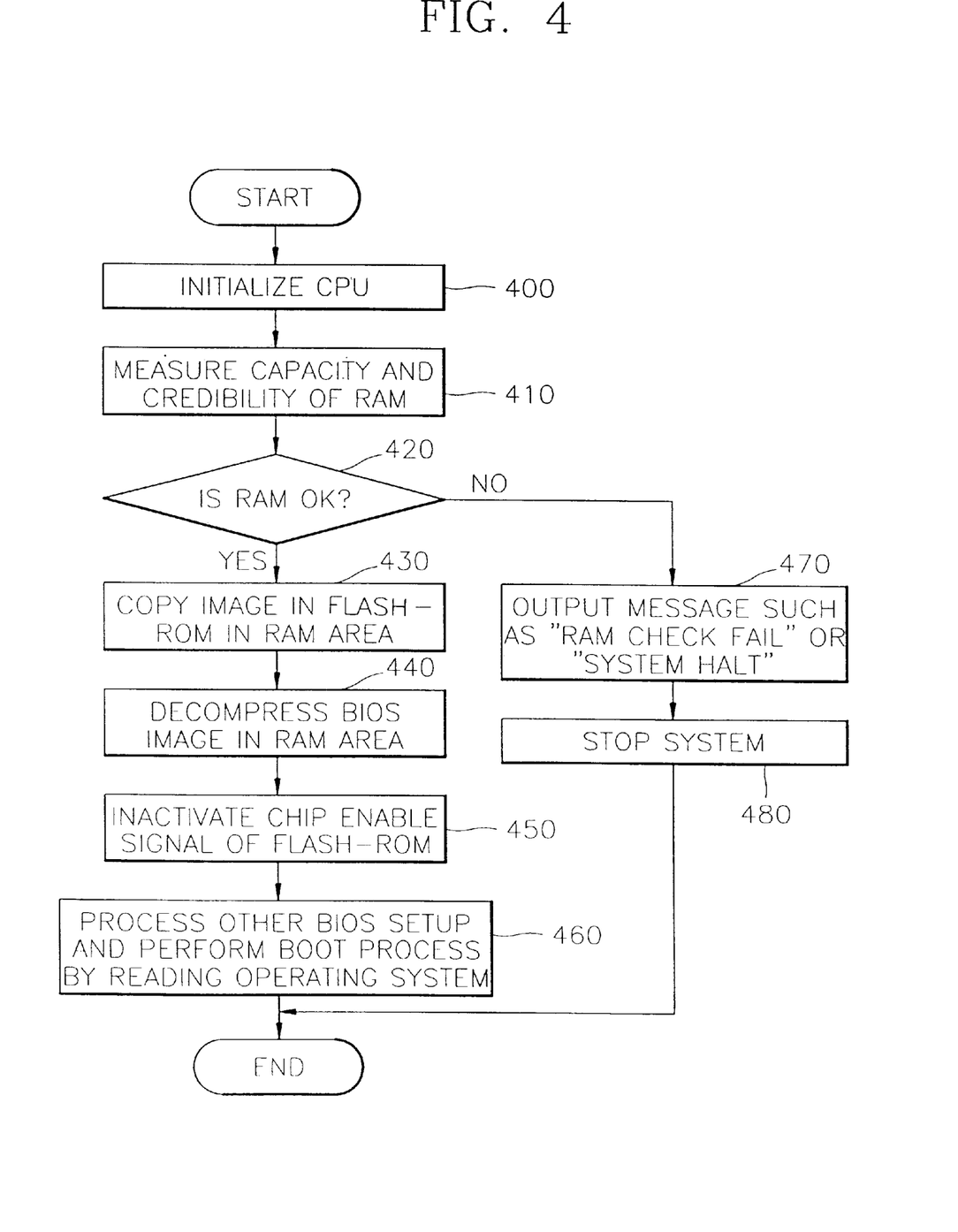
FIG. 4 is a flow chart showing a boot process of a computer system having the flash-read-only-memory (flash-ROM) controlling device, in accordance with the principles of the present invention.

Refer now to FIG. 4, which is a flowchart showing a boot process of a computer system having the flash-read-only-memory (flash-ROM) controlling device, in accordance with the principles of the present invention. FIG. 4 shows a process of initializing a computer system having the flash-ROM 310 according to the present invention.

In FIG. 4, at step 400, when the power of the computer system is turned on, the central processing unit (CPU) of the computer system is initialized and the basic input output system (BIOS) commands stored in the memory address "OFFFF:0000h" are executed. At step 410, the basic input output system (BIOS) measures capacity and credibility of random access memory (RAM) of the computer system. At step 420, a check is made to determine whether the random access memory is satisfactory. At step 430, when the random access memory was deemed satisfactory in step 420, the basic input output system copies the basic input output system image in a random access memory area. In other words, at step 430, BIOS information is copied from the flash-ROM to the random access memory. Such steps are needed because the access time for the flash-ROM is greater than the access time for the random access memory. Thus, the efficiency of the computer system is improved when the basic input output system is stored in the random access memory and utilized while at that location.

Also, the basic input output system image is stored in the flash-ROM in a compressed state to reduce the required capacity of the flash-ROM. Thus, for the basic input output system to be used, the basic input output system must be decompressed. At step 440, the basic input output system commands decompress the basic input output system image copied to the random access memory area. The decompressed basic input output system module is stored in the memory address "OEXOO:0000h" (here, X can be any of 0 through 0Fh according to the capacity of the ROM-BIOS) through "OFFFF:000Fh" and the memory address area is no longer allocated for the flash-ROM. However, the flash-ROM can replace the RAM area again according to the control of software so that the basic input output system image recorded therein can be destroyed.

At step 450, in the present invention, to prevent the basic input output system image stored in the flash-ROM from being destroyed, a flash-ROM controlling device is used to inactivate the chip enable signal of the flash-ROM. At step 460, the decompressed basic input output system completes the initialization process of the computer system, performs other basic input output system setup functions, and boots the computer system by reading an operating system.

At step 470, when the random access memory (RAM) was deemed unsatisfactory in step 420, the basic input output system outputs a "RAM CHECK FAIL" or "SYSTEM HALT" message. In other words, at step 470, when a problem is detected in the RAM in step 420, the basic input output system outputs an error message. At step 480, the basic input output system stops the operation of the computer system.

Figure 5:
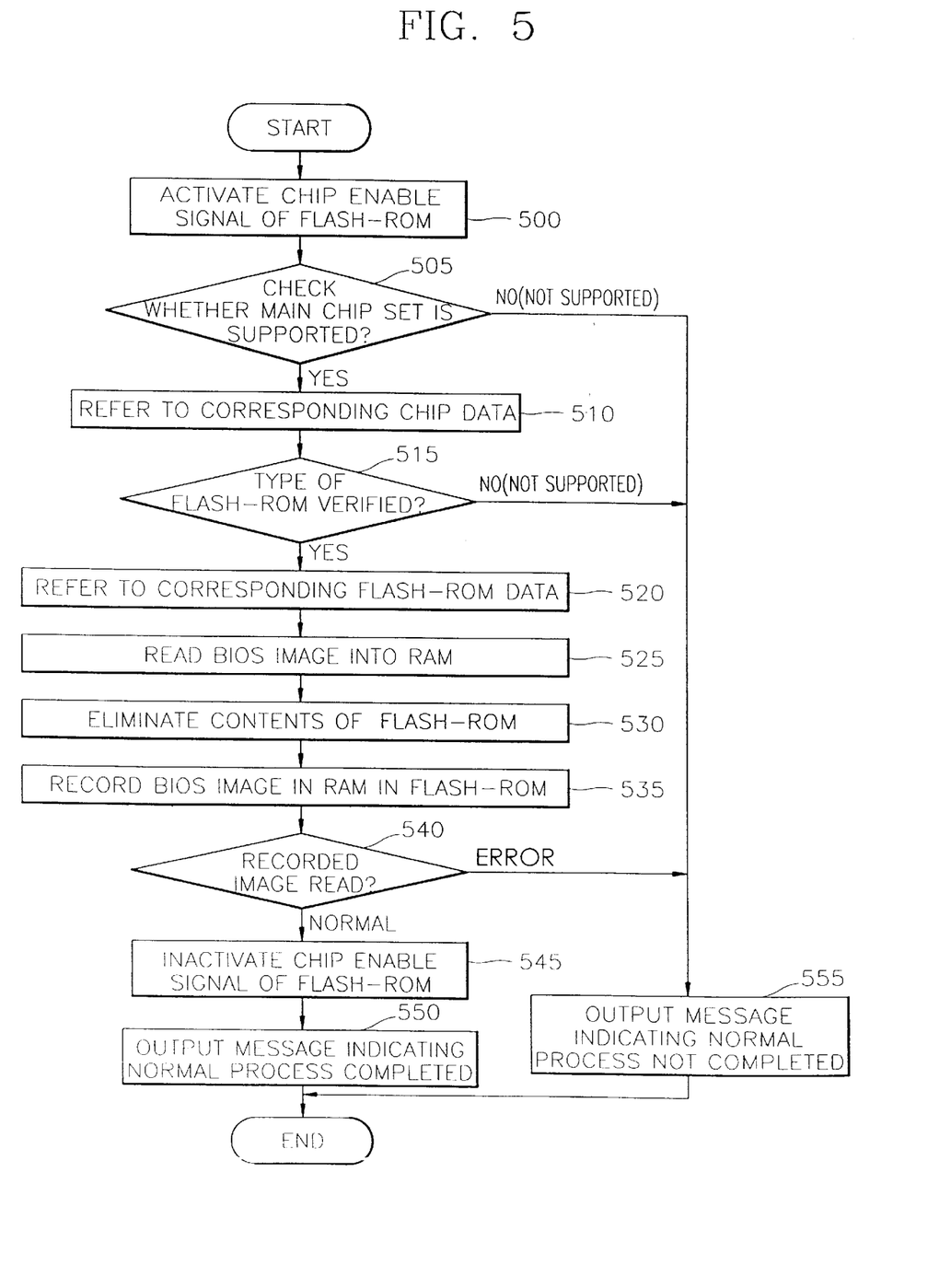
FIG. 5 is a flow chart showing a process of updating basic input output system (BIOS) stored in a flash-read-only-memory (flash-ROM) protected by the flash-read-only-memory (flash-ROM) controlling device, in accordance with the principles of the present invention.

Refer now to FIG. 5, which is a flow chart showing a process of updating basic input output system stored in a flash-read-only-memory (flash-ROM) protected by the flash-ROM controlling device, in accordance with the principles of the present invention. FIG. 5 shows a method of updating the basic input output system of the computer system stored in a flash-ROM when the flash-ROM controlling device 300 according to the present invention is initialized.

With reference to FIG. 5, in the present embodiment the process of updating the basic input output system is achieved by using an application program. A new basic input output system can be obtained via diskettes or a network.

At step 500, the application program allows the controller 302 included in the flash-ROM controlling device 300 to generate a first control signal. At step 505, the type of main chip set is identified in order to determine whether it is supported. At step 510, when the type of main chip set is deemed to be supported in step 505, corresponding chip data is referred to. At step 515, a verification of the type of flash-ROM is attempted. In other words, the flash-ROM of the computer system is identified. At step 520, when the type of flash-ROM is deemed to be supported in step 515, corresponding flash-ROM data is referred to. Control data necessary for controlling the flash-ROM is accessed. At step 525, the image of a new basic input output system is read into the random access memory. At step 530, the stored contents in the flash-ROM are eliminated. At step 535, the new basic input output system image currently located in the random access memory is stored in the flash-ROM.

In FIG. 5, at step 540, the image recorded in the flash-ROM is read again and a determination is made to the status of the image recorded in the flash-ROM. At step 545, when the image recorded in the flash-ROM is deemed to be normal in step 540, the controller 302 generates a second control signal to inactivate the chip enable signal. At step 550, the controller 302 outputs a message indicating that the normal booting process has been completed.

In FIG. 5, at step 555, when the type of main chip set is deemed to be not supported in step 505, a message is output which informs a user that the normal booting process has not been completed and the process is terminated. Also at step 555, when the type of flash-ROM is deemed to be not supported in step 515, a message is output which informs a user that the normal booting process has not been completed and the process is terminated.

As described above, according to the present invention, a basic input output system stored in a flash-ROM can be protected from a malicious program manufactured to destroy basic input output system stored in the flash-ROM of a computer system, or a virus program, using technology of a main chip set of a computer system which is widely known to public.

The foregoing paragraphs describe the details of a flash-read only memory (flash-ROM) controlling device used for a computer system, and more particularly to a device protecting a basic input output system read only memory (BIOS-ROM) stored in a flash-read only memory (flash-ROM) of a personal computer from malicious programs, and a method thereof.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contem-

What is claimed is:

1. An apparatus controlling a memory unit of a computer system, the apparatus comprising:
   a memory unit storing first predetermined instructions to be executed when said computer system is powered on;
   a random access memory temporarily storing data;
   a control unit generating a control signal selected from among a first signal and a second signal, said control signal controlling an enable signal of said memory unit; and
   a control buffer unit having an input port receiving said enable signal and an output port connected to an enable port of said memory unit, said output port outputting to said memory unit said enable signal not modified when said control signal corresponds to said first signal thereby allowing said first predetermined instructions stored in said memory unit to be revised, and said output port outputting to said memory unit said enable signal modified when said control signal corresponds to said second signal thereby not allowing said first predetermined instructions stored in said memory unit to be revised;
   when said control signal corresponds to said first signal, second predetermined instructions being recorded in said random access memory and then said first predetermined instructions being deleted from said memory unit and then said second predetermined instructions being copied from said random access memory to said memory unit;
   when said second predetermined instructions are copied from said random access memory to said memory unit, said control unit generating said control signal corresponding to said second signal to not allow said second predetermined instructions stored in said memory unit to be revised, said second signal being generated after said second predetermined instructions are copied from said random access memory to said memory unit and before said computer system is powered off.

2. The apparatus of claim 1, wherein said memory unit corresponds to nonvolatile memory.

3. The apparatus of claim 1, wherein said memory unit corresponds to flash-read-only-memory.

4. The apparatus of claim 3, wherein said first predetermined instructions correspond to a first basic input output system of said computer system.

5. The apparatus of claim 4, wherein said control unit further comprises:
   a decoder unit detecting an input-output address of said computer system; and
   a data storing unit storing control data of said computer system and outputting said control data as said control signal, when said input-output address is detected.

6. The apparatus of claim 5, wherein said control data stored by said data storing unit corresponds to a predetermined bit from a data bus of a system bus of said computer system.

7. The apparatus of claim 6, wherein said input-output address is detected from an address bus of said system bus of said computer system.

8. The apparatus of claim 7, wherein said data storing unit corresponds to a D type flip-flop circuit and said predetermined bit corresponds to a least significant bit of said data bus.

9. The apparatus of claim 1, wherein said control unit is controlled by software program instructions.

10. The apparatus of claim 1, wherein said control buffer unit receives said enable signal from a peripheral component interconnect-industry standard architecture bridge of said computer system.

11. A method of protecting predetermined data stored in a memory of a computer apparatus, the method comprising the steps of:
    when a computer apparatus is powered on, starting a computer initialization process of said computer apparatus;
    executing a basic input output system power on self test procedure of said computer apparatus;
    initializing a processor of said computer apparatus and analyzing a random access memory of said computer apparatus;
    determining whether said random access memory is satisfactory;
    when said random access memory is satisfactory, copying basic input output system power on self test code from a flash read only memory of said computer apparatus to an area of said random access memory during the basic input output system power on self test procedure of said computer apparatus;
    when the basic input output system power on self test code is copied from said flash read only memory to said area of said random access memory during the basic input output system power on self test procedure, disabling a chip-enable signal to prevent data in said flash read only memory from being revised;
    decompressing the basic input output system power on self test code copied to said random access memory;
    storing second predetermined instructions in said random access memory, said second predetermined instructions corresponding to the basic input output system power on self test code decompressed;
    executing said second predetermined instructions stored in said random access memory; and
    when said random access memory is not satisfactory, outputting an error message and stopping said computer initialization process.

12. The method of claim 11, wherein the basic input output system power on self test code stored in said flash read only memory corresponds to a basic input output system image.

13. The method of claim 11, said area of said random access memory corresponding to a predetermined area of said random access memory.

14. The method of claim 11, further comprising the step of performing a boot process by executing operating system instructions of an operating system of said computer apparatus.

15. The method of claim 11, the data in said flash read only memory being able to be revised prior to said disabling of said chip-enable signal.

16. A method of modifying data stored in a memory of a computer apparatus, the method comprising the sequential steps of:
    outputting a first control signal to allow first basic input output system data stored in a first memory unit to be revised;
    identifying a main chip set and said first memory unit of said computer apparatus;
    copying second basic input output system data to a random access memory;

deleting said first basic input output system data stored in said first memory unit;

copying said second basic input output system data from said random access memory to said first memory unit;

reading and verifying said second basic input output system data stored in said first memory unit; and outputting a second control signal to not allow said second basic input output system data stored in said first memory unit to be revised.

17. The method of claim 16, wherein said first memory unit corresponds to a flash-read-only-memory.

18. The method of claim 17, further comprising outputting an error message when said reading and verifying of said second basic input output system data stored in said first memory unit fails.

19. The method of claim 18, wherein said first basic input output system data stored in said first memory unit corresponds to a first image file including a first basic input output system.

20. The method of claim 19, wherein said second basic input output system data stored in said first memory unit corresponds to a second image file including a second basic input output system.

21. The method of claim 16, wherein said identifying step further comprises a step of determining control data corresponding to said first memory unit.

22. The method of claim 16, wherein said identifying step further comprises a step of accessing control data to be utilized to control said first memory unit.

23. The method of claim 16, said step of outputting said second control signal being performed after said verifying of said second basic input output system data and before said computer apparatus is powered off.

24. An apparatus, comprising:

a flash-read-only-memory storing a first basic input output system of a computer unit;

a random access memory area temporarily storing data of said computer unit; and a control unit controlling said flash-read-only-memory, activating said flash-read-only-memory, and inactivating said flash-read-only-memory, said activating of said flash-read-only-memory being performed to allow said first basic input output system stored in said flash-read-only-memory to be revised, and said inactivating of said flash-read-only-memory being performed to not allow said first basic input output system stored in said flash-read-only-memory to be revised;

when said control unit performs said activating of said flash-read-only-memory, said random access memory area temporarily storing a second basic input output system and then said first basic input output system being deleted from said flash-read-only-memory and then said second basic input output system being copied from said random access memory area to said flash-read-only-memory;

after said second basic input output system is copied from said random access memory to said flash-read-only-memory and without restarting said computer unit, said control unit performing said deactivating of said flash-read-only-memory.

25. The apparatus of claim 24, wherein said apparatus is initialized when said apparatus is powered on.

26. The apparatus of claim 24, wherein said first basic input output system corresponds to a compressed set of instructions utilized to test said apparatus when said apparatus is powered on.

27. The apparatus of claim 26, wherein said compressed set of instructions in said random access memory area is decompressed and then utilized to test said apparatus.

* * * * *